INVENTOR
ERIK BJORN DAHLIN

3,534,400
PARAMETER IDENTIFICATION METHOD FOR PROCESS CONTROL SYSTEMS

Erik Bjorn Dahlin, Saratoga, Calif., assignor to International Business Machines Corporation, Armonk, N.Y., a corporation of New York
Filed Dec. 7, 1966, Ser. No. 599,878
Int. Cl. G05b $17/00$, $19/00$
U.S. Cl. 235—151.1                           9 Claims

ABSTRACT OF THE DISCLOSURE

Method of process control for identifying process parameter values. A known model equation with known process parameters but unknown process parameter values relates a process input variable to a process output variable. The process input variable is initially perturbated and the values of the process input variable and output variable are measured at selected times. Using these values, at least one process parameter value is identified by minimizing the sum of the residuals squared of a differentiated form of the model equation; and at least another process parameter value is identified by minimizing the sum of the residuals squared of an integrated form of the model equation. Remaining parameter values may then be solved for by trial and error.

---

This patent application is directed to process control and more particularly to a hybrid method of process parameter identification using a combined derivative and integral approach for identifying certain process parameters. Appropriate adjustments are then made to process variables.

Process parameter identification has been a severe and wide-spread problem in the prior art. It has been known that the dynamics of a physical process (i.e., the inter-relationship between input variables and output variables) can be expressed mathematically. This relationship is referred to as a model of the process. A process model normally takes the form of a dynamic mathematical equation, such as a differential equation. This equatiton is termed dynamic in that it represents the variations and inter-relationships between the noted process characteristics on a time basis.

The model equation of a process is of assistance both in initially designing a controller for the process and for adjusting, or tuning, a controller that is controlling the process. In the latter case, the model is updated repeatedly in order to provide the necessary knowledge for automatic adjustment of the controller despite changes in process dynamics. By using an updated model, the controller can be adjusted to operate on the process with a knowledge of (i.e., tuned to) the current condition of the process.

Identifying process characteristics, or parameters, is a complicated problem especially when these parameters vary with time and the process is characterized by a number of process disturbances, or noise, as is normally the case. It has been further complicated in the prior art by an inability to develop a method that accurately and surely identifies the parameters, or constants, in the model when the various adverse factors are taken into consideration.

Some methods known to the prior art identified certain parameters well under certain circumstances, but failed to identify other parameters under similar circumstances. Other methods were known that worked well in different respects or under different circumstances, but no method was known that operated well under all conditions and circumstances. Prior methods either required extensive data gathering operations or exceptionally long and involved computations or both. Process control computers of the type commonly found in industry could not tolerate these factors. Thus, no satisfactory one-line method was known to the prior art for estimating process parameter values in a model equation with sufficient certainty that the parameter values could then be provided to an associated controller for initiating a desired control action without first manually checking the parameters to insure reasonableness of their value. The reason for this is that each known technique has certain somewhat undefined areas where it fails to identify the parameters with the necessary accuracy. Thus, these techniques could not be relied upon completely.

Accordingly, it is a general object of this invention to overcome some of the cited disadvantages of the prior art.

Phrased differently, it is a general object of this invention to provide an improved method for identifying process parameters.

Another general object of this invention is to provide an improved method of identifying process parameters for utilization in cooperation with an associated process controller.

A more particular object of this invention is to provide an improved process parameter identification scheme operable on an on-line basis.

Another more particular object of this invention is to provide an improved method of determining parameters in a model equation wherein the process is partitioned into a number of elements, each characterized by its own model equation.

Yet another object of this invention is to provide an improved method of determining the parameters in a model equation wherein the adverse effects of process noise are substantially reduced.

A further object of this invention is to provide an improved method of identifying process parameters in a model equation wherein a first part of the method is directed to identifying at least one parameter by a method most suited to that parameter, and a second part of the method is directed to determining other parameters by a method most suited to their identification.

A still further object of this invention is to provide an improved method of identifying parameters in a model equation wherein that method is adapted for implementation on-line in an associated computer.

A still further object of this invention is to provide an improved integral method of identifying process parameters wherein the model output is compared with the process output to best identify a particular parameter.

Still another object of this invention is to provide a hybrid method of identifying parameters in a model equation wherein a differentiated form of the model equation is used to identify certain parameters, while an integrated form of the model equation is used to identify other process parameters.

Yet another object of this invention is to provide an improved process control method fulfilling the objects already stated with particular effectiveness on a paper-making process.

My invention includes a new method of inter-relating measured and calculated variables in a process. It involves taking a series of physical measurements, performing certain mathematical operations on the values obtained by these measurements, and then adjusting certain variables in accordance with the results obtained from the computation. The computer program for performing the computation is not my invention. My invention is a control technique or, more explicitly, my invention is a method of adjusting the setting of a process variable in accordance with signals obtained from the process being controlled.

In accordance with one aspect of my invention, a novel control technique which includes a new method for identifying the value of parameters in a model equation is disclosed. The novel method of my invention comprises initially perturbing the process and measuring the value of a process input and the value of a process output at selected times. An estimated value of one parameter is selected. That value is then used in computations involving matrix expressions to identify the other parameters. Those computations are performed so as to minimize the sum of the residuals squared; a residual is a term indicating the amount of unbalance in the model equation when measured values of input and output are substituted therein. The sum of residuals squared are minimized at least twice using two different forms of the model equation, called the differential form and the integral form. The parameter which had an assigned value is solved for by trial and error (or iterations). Notwithstanding the fact that the integral form and the differential form of the model equation are merely straight-forward transformations, the estimation of the parameters using residuals can yield different results depending upon which form of the equation is used. It has been found that the differential form yields a more accurate estimate of certain parameters in the model, whereas the integral form of the equation yields a better estimate of other parameters in the model. The combined use of the two forms of the model equation yields a hybrid method which produces superior results.

Once the parameters in the model have been estimated, these parameters are supplied to an associated tuner which uses their value to generate signals indicating the appropriate gain settings for the controller that is controlling the process. Once these gain settings have been calculated by the tuner, they are supplied to the controller, and the controller then adjusts a process variable. Generally, that variable is the process input referred to above.

Practicing the novel method of my invention involves many complex steps and operations within an associated digital computer including shifting, multiplying, adding, operating on stored data, etc. However, my invention could be practiced with an analog computer, with special purpose digital hardware, or if the time constant associated with the particular process being controlled is long, the method of my invention could be practiced by hand without any electronic calculating equipment. Thus, my invention relates to the method of control, and not to the particular apparatus used to practice the method.

The advantages possessed by my invention are many. Perhaps the chief advantage is that the novel method of my invention can be used on-line with an associated digital computer controlling a process. My method is significantly faster and has substantially greater reliability than any method known to the prior art for identifying process parameters. The increased reliability flows from the hybrid nature of my method; that is, a first portion of the method is directed to identifying some of the parameters whose values are obscured by certain types of disturbances, while a second portion of my invention is directed to identifying the other process parameters. Each portion of my invention then identifies certain process parameters with a high degree of accuracy, while the overall method of my invention identifies all the process parameters of interest to a model equation with a high degree of certainty. In addition to the certainty, the identification is most rapid in that it is readily adaptable to performance on a digital computer, taking advantage of the inherent speed of those machines and providing on-line identification. Further, the method, although hybrid, is of relatively few steps, each of which is of a relatively simple nature—thereby further increasing the speed of operation. In other words, one can identify process parameters faster and with more certainty than was possible in prior art approaches.

The rapidity of operation and the few steps required to practice the method of my invention makes it readily adaptable to on-line determination of process parameters; further, as noted above, it is readily adaptable to such on-line determination with the aid of a digital computer. By determining and identifying the process parameters on an on-line basis, it is not necessary to upset the regular production of the process. This means that the throughput of the process is not adversely affected; there is no down time, nor lost product, due to my novel method. If the advantages noted immediately above were available from a long and cumbersome method, the method would be intolerable in that an associated digital computer could not afford the memory positions or the computing time necessary to implement such a method. However, the novel method of my invention, comprising relatively few steps, is well adapted to implementation in a digital computer on an on-line basis. This further increases the attractiveness of my invention.

The certainty with which the process parameters are identified enables one to use the parameter values in an associated control law with minimum checking of their accuracy. This means that an associated digital computer can implement the novel process identification method of my invention and then use the data so obtained directly in its control algorithms. This method thus represents the first reliable, practical on-line method for process identification.

Some processes in the prior art were almost impossible to identify with a single identification method. Such processes are readily adapted to being identified under the teachings of this invention. Thus, my invention enables sophisticated control techniques to be applied to processes which previously could not be so controlled.

Another advantage of my invention is the fact that it can be applied to elements of a process. That is to say, a process can be partitioned into separate elements, each element having perhaps its own control law but certainly its own model equation. The process parameters for a particular element can be identified with rapidity and certainty; control action is then taken on each of the elements, thereby rendering the overall control of the process more precise and more definite than prior art techniques which partitioned processes.

As a particular advantage of my invention, it can be applied with great success to the control of Fourdrinier papermaking machines. When used in that application, the advantages of on-line control as measured by increased through-put, decreased costs, etc. are particularly noteworthy. Further, those machines have long undergone rather imprecise, manually-aided control, thereby rendering the advantages of this invention more striking by contrast.

In my invention, filtering can be employed to remove most adverse effects of the process noise. The filtering can be done with a relatively simple filter which is the same on the input as on the output. Its effect on each is uniform. The best digital filter can be automatically selected. When the best digital filter for a particular application has been so determined, this same filter may also be implemented by analog networks in the computer system. Filter design itself is not complicated; rather, a suitable filter for a particular process can be designed by one skilled in the art with a minimum of difficulty.

The above statement of advantages from my invention is not all inclusive. However, it highlights some of the major advantages possessed by my invention and serves to indicate its practical importance in the art relating to the control of physical processes.

The foregoing and other objects, features and advantages of the invention will be apparent from the following more particular description of a preferred embodiment of the invention as illustrated in the accompanying drawings.

Figure 1:
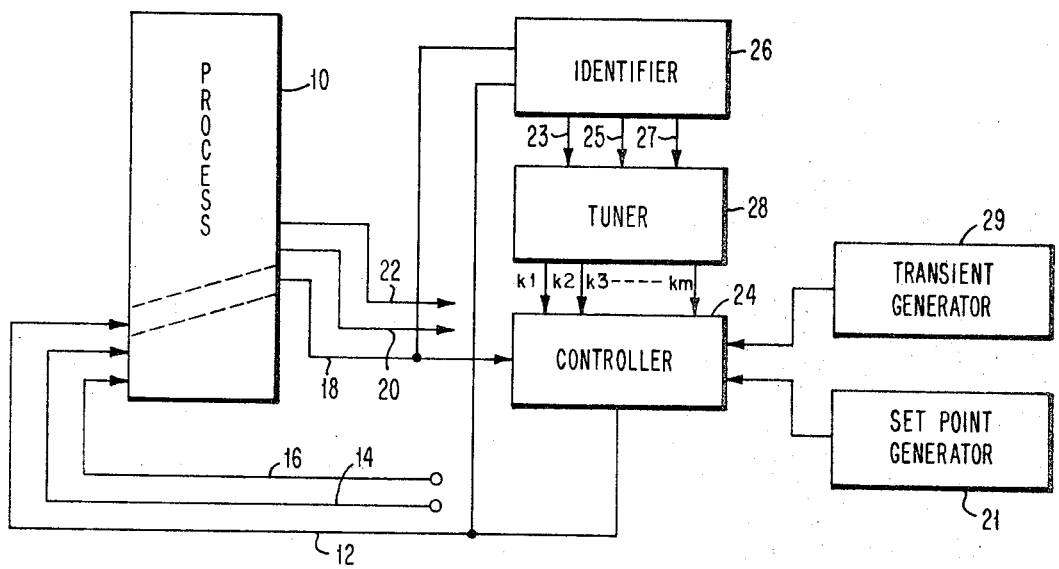
FIG. 1 shows a block diagram of a process and associated control equipment suitable for practicing the method of this invention.

FIG. 1 shows a general layout of typical equipment for practicing the novel method of my invention. A physical process 10, such as a Fourdrinier papermaking machine, is characterized by input and output variables (or controlling and controlled variables). The input variables are adjusted by signals on lines 12, 14 and 16. Signals which indicate the value of output variables are present on a plurality of lines 18, 20 and 22. In an actual process, there may be more lines present than those noted. For the purposes of illustrating the present invention, attention will be concentrated on that part of process 10 which is controlled by signals $x(s)$ on line 12 and which generates output signals $y(s)$ on line 18. This part of the process will hereinafter be termed control loop 12-18. The value of the signal on line 12 is set by a controller 24 (other controllers, not shown, set the signals on lines 14, 16). Controller 24 generates signals on line 12 in response to the signals that it receives on line 18 and to a setpoint signal from generator 21; this is accomplished in the conventional manner of subtracting the signal on line 18 from the setpoint signal. In order for controller 24 to control loop 12-18 in an optimum manner, the gain values for controller 24 must be adjusted to reflect the current state of process 10. Appropriate gain values for controller 24 are supplied on lines $k1, k2, k3 \ldots km$ by a tuner 28. The tuner 28 in turn receives identified parameter signals on lines 23, 25, 27 which indicate the present state of the process 10 and in particular the present state of that part of the process associated with control loop 12-18 from an identifier 26. It should be noted that there may be more than three lines supplying identified parameter signals. The identifier 26 uses the measured value of the controlled variable from line 18 and the controlling variable from line 12 (after perturbation of process 10 by a transient signal from box 29) to update certain parameters in a mathematical model of process 10.

Each element 24, 26 and 28 could be a separate general purpose digital computer, a separate special purpose digital computer, a separate analog computer, or the steps performed by each of these elements could be performed by a single computer. The present invention involves the specific steps that are preformed, and not the apparatus for performing the steps. If process 10 operated slowly enough, all of the steps could be performed manually. Since the specification of particular apparatus is not relevant to the present invention, and since many different apparatus (as well as hand operations) could be used, a detailed explanation of particular apparatus for performing my invention will not be presented.

Figure 2:
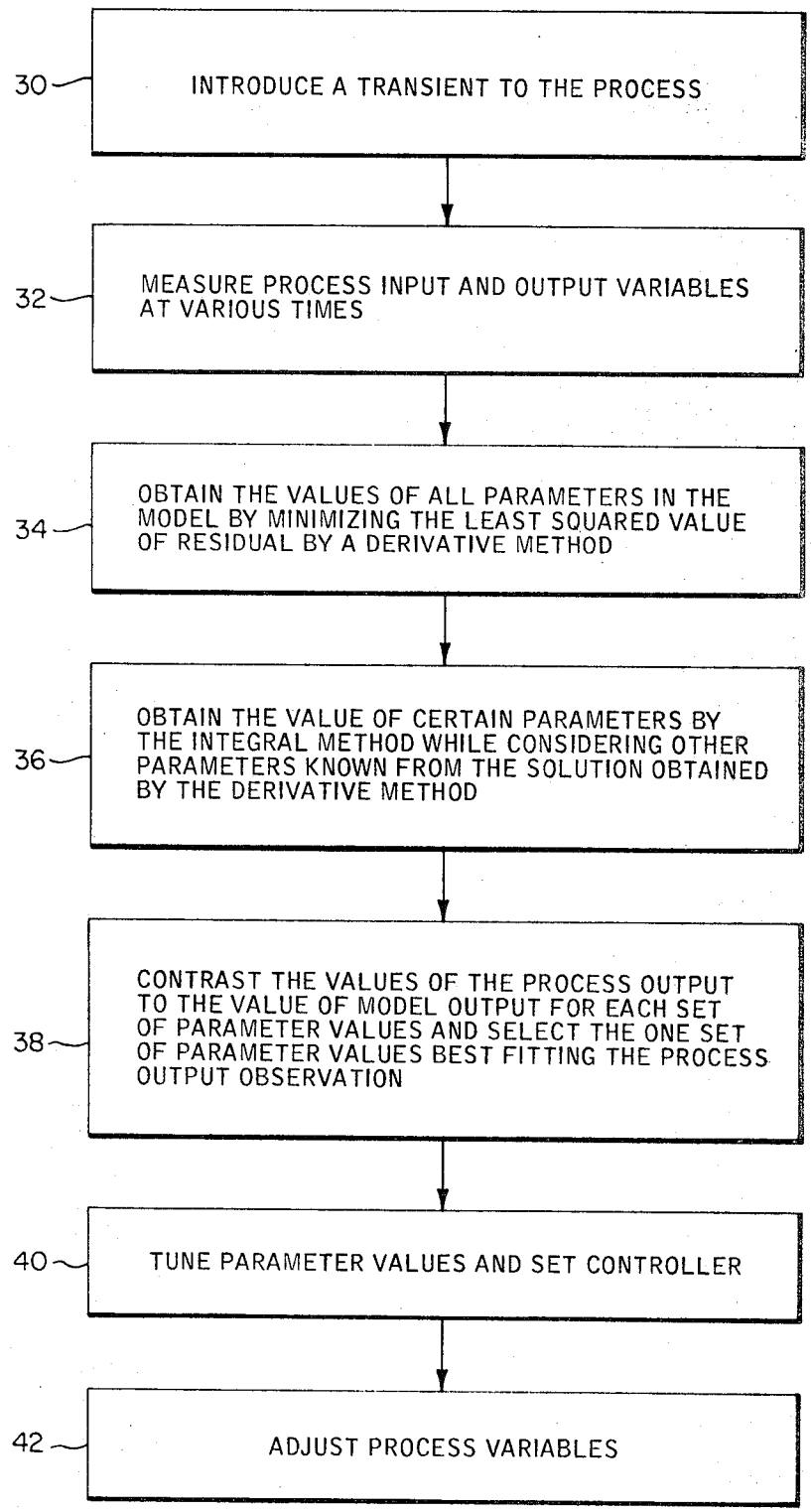
FIG. 2 shows in block diagram form the primary steps of my invention.

FIG. 1 thus shows general apparatus which can be used to practice the novel method of my invention. The flow chart of FIG. 2 outlines the basic steps in practicing the novel method of my invention. The method as shown in FIG. 2 is presented in general terms applicable to many different processes. It will be presented in more detailed terms with reference to FIG. 3.

With more particular reference to FIG. 2, box 30 indicates the initial step of perturbating the process 10 with a test transient. This could be accomplished by adjusting a setpoint for a variable or even manually jiggling a valve, like a stock flow valve. Measured values of process input variables and associated output variables at various times are then sensed, as shown in box 32. For example, these measured values could be signals made available on line 12, 18 respectively of FIG. 1.

Box 34 of FIG. 2 indicates that, using the model equation for that part of process 10 associated with control loop 12-18, a residual term can be defined by using a derivative method. This residual term is obtained by inserting sampled values of process input and output variables obtained in the step of box 32 in a differentiated version of the model equation. The time derivative necessarily present in the differential form of the model equation is represented by a suitable sampled data expression. By computation utilizing all samples collected during a short test period during which the process was slightly perturbated, as noted in the step of box 30, all parameters are computed by minimizing the least square values of the residual; this computation is referred to herein as the derivative method. There are several satisfactory derivative methods known to the prior art. One such method is illustrated subsequently with reference to a more detailed explanation of my invention in FIG. 3.

As indicated in box 36, the model equation is subsequently operated upon according to my integral method wherein another residual is formed from the original model equation by integration with respect to time. Certain parameters whose true values are not obscured by the integral method of identification are then determined from all the available samples of the process variables; signals representing those parameters are generated.

With continued reference to FIG. 2, in particular box 38 thereof, the identified parameters are then checked for accuracy. The model output for a first set of identified parameter values obtained by the derivative method is contrasted to the observed process output. The model output for a second set of parameter values identified by the integral method is then contrasted to the observed process output. The set of answers providing the smallest deviation between the model output and the observed process output (as represented by squaring an error term reflecting this deviation) is then selected as the best answer. The best answer thus contains a plurality of identified parameter values and these values are provided, as indicated in box 40 of FIG. 2, to an associated tuner and controller so that the controller can be tuned in accordance with the new process parameter values. Box 42 shows the physical adjustment, or control, of input variables according to a new control algorithm in controller 24 using the newly identified parameters in tuner 28.

Figure 3:
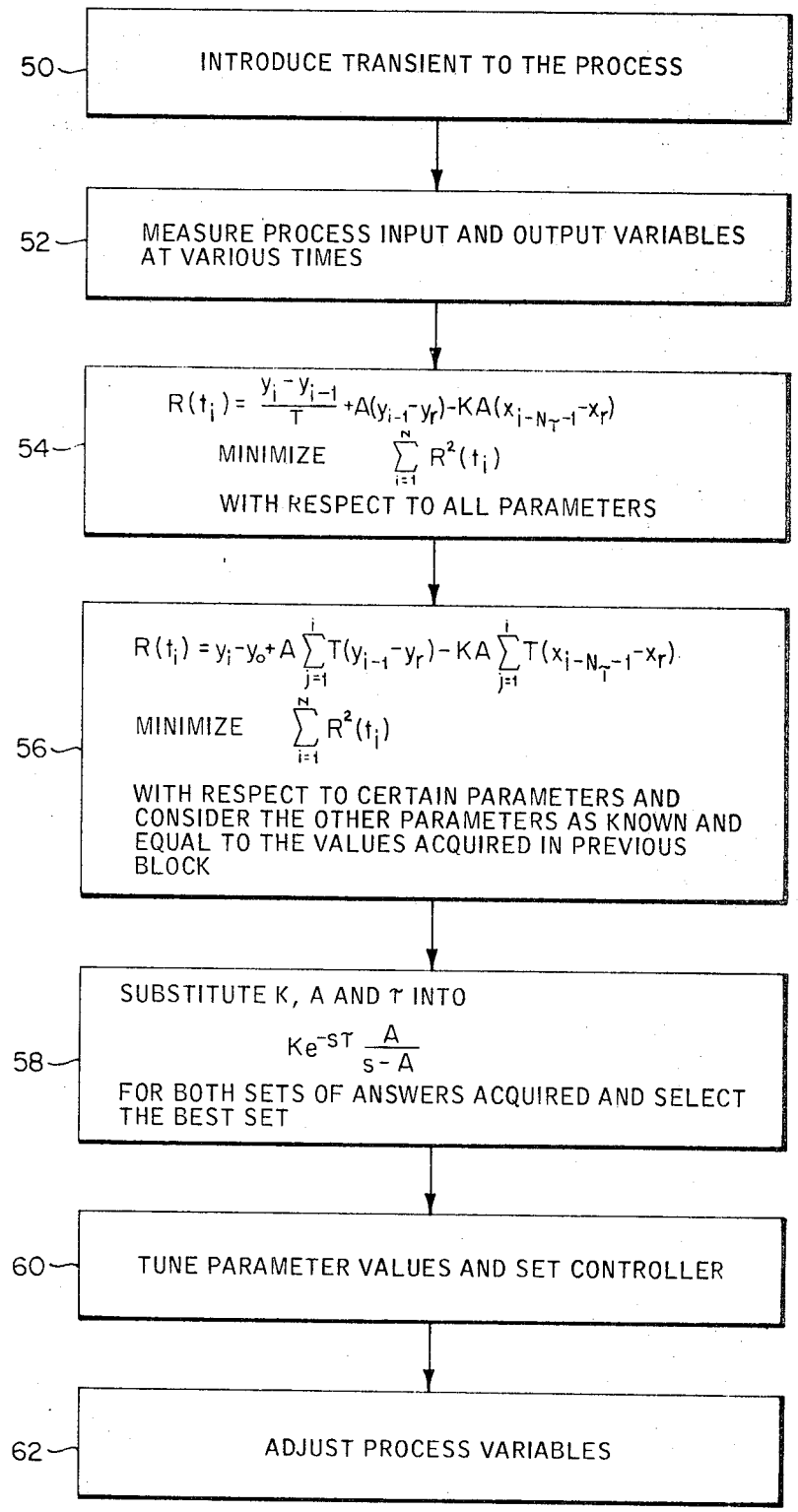
FIG. 3 shows in block diagram form exemplary steps for practicing my invention.

Before discussing FIG. 3, note the method outlined in FIG. 2 requires the gathering of process input and output signals; that is, signals representing controlling (sometimes referred to as manipulated) and controlled variables. The gathering of those signals under the control of an associated digital computer is not, at this time, a difficult task for one skilled in the art to which this invention pertains; see, for example, "Computer Control of Industrial Processes," by E. S. Savas, published by McGraw-Hill, 1965, one of several texts on this subject.

Similarly, the method outlined in FIG. 2 requires a tuning operation. A suitable tuning method, and one particularly adapted for utilization with the novel method of this invention, is described in my concurrently filed application; IBM Docket 18334 "Coefficient Tuning Methods for Process Control Systems."

The general steps of my invention are thus set forth in FIG. 2. A more detailed explanation is presented in conjunction with FIG. 3.

With reference to FIG. 3, the first step shown in box 50 is perturbating the process; box 52 then illustrates measuring the values of the process input and output at various times. Since the example shown in FIG. 3 is that of a Fourdrinier papermaking machine, or a section thereof like control loop 12-18, it will be meaningful if the model equation for the particular process represented by that type of machine is discussed first. That model equation for control loop 12-18 can be represented in transfer function form as:

$$\frac{y(s)}{x(s)} = Ke^{-s\tau}\frac{A}{s+A} \qquad (1)$$

where:

K=process gain;
A=pole value (or characteristic frequency);
$\tau$=transport delay for the Fourdrinier machine or the particular section of it being identified;
s=the Laplace symbol;
e=the natural logarithmic base;
y(s)=transformed value of a process output variable (signal on line 18); and
x(s)=the transformed value of a process input variable (signal on line 12).

With continued reference to FIG. 3, it should be observed that in order for Equation 1 to define the operation of control loop 12–18, values for the following parameters must be identified:

K—the process gain;
A—a pole value (or the characteristic frequency) of control loop 12–18; and
$\tau$—the transport delay.

Since prior art identification methods would not yield uniformly satisfactory values for these parameters, the novel method of my invention was conceived wherein a first method is used to estimate, or identify, at least one process parameter with a high degree of accuracy and a second method is used to identify the other necessary process parameters with a correspondingly high degree of accuracy.

With continued reference to FIG. 3, box 54 shows the model Equation 1 written in a differential form and operated on according to a derivative identification method. The residual is formed by inserting actual observations of process input and output in the differential form of model Equation 1, thereby rewriting that equation. Since sample data expressions are preferable, the residual for sample set number $i$ then is $$R(t_i) = \frac{y_i - y_{i-1}}{T} + A(y_{i-1} - y_r) - KA(x_{i-N_\tau-1} - x_r) \quad (2)$$

where:

$R(t_i)$=the residual corresponding to the sample instant $t_i$
T=time between successive samples $x_i$ and $x_{i+1}$
$N_\tau$=the number of sampling intervals corresponding to the transport delay time $\tau$; and
A, K and $\tau$ are defined as in Equation 1.

Mathematically, the equations for calculating the optimal K and AK values for each $\tau$ are given by the matrix expression:

$$\binom{A}{AK} = \left[ \begin{array}{c} \sum_{i=1}^{N} T(y_i - y_r)^2 \\ -\sum_{i=1}^{N} T(x_{i-N_\tau-1} - x_r)(y_{i-1} - y_r) \end{array} \right. \\ \left. \begin{array}{c} -\sum_{i=1}^{N} T(x_{i-N_\tau-1} - x_r)(y_{i-1} - y_r) \\ \sum_{i=1}^{N} T(x_{i-N_\tau-1} - x_r)^2 \end{array} \right]^{-1} \\ \left[ \begin{array}{c} -\sum_{i=1}^{N} (y_{i-1} - y_r)(y_i - y_{i-1}) \\ -\sum_{i=1}^{N} (x_{i-N_\tau-1} - x_r)(y_i - y_{i-1}) \end{array} \right] \quad (3)$$

where:

$(\ )^{-1}$ indicates the inverse of the matrix
$x_r$=steady state value of $x$
$y_r$=steady state value of $y$ Note that the steady state values $x_r$ and $y_r$ are estimated by known techniques from data which may have been collected prior to the identification operations per se. They are obtained for example, by curve fitting where an averaged value is generated from experimental data. These techniques are well known as the art; $x_r$ and $y_r$ are treated as known constants, $x_i$ and $y_i$ refer to discrete variable samples.

In explanation of the above, note that the numerical solution is performed by minimizing $$\sum_{i=1}^{N} R^2(t_i) \quad (4)$$

with respect to A, K and $\tau$. The minimization with respect to A and K is performed by taking partial differentiations with respect to both A and the product AK and setting these partial derivatives equal to zero. The minimization with respect to $\tau$ is performed by a search procedure. For each value of $\tau$, the K and AK values which minimize $$\sum_{i=1}^{N} R^2(t_i) \quad (5)$$

are computed as well as the value of $$\frac{1}{N-1} \sum_{i=1}^{N} R^2(t_i) \quad (6)$$

(to be called the residual variance) associated with these A and AK values. Different $\tau$ values are tried systematically until the optimal $\tau$ value which minimizes the variance has been found. The K value associated with this variance is computed from the A and AK values for the same $\tau$ by division:

$$K = AK/A \quad (7)$$

The solution required by the derivative method typically will have an accurate solution for $\tau$, and that value is used in the next step when the problem is solved by the integral method.

With continued reference to FIG. 3, note that the first steps in my novel method have usually identified $\tau$ with the accuracy necessary for satisfactory process control. In order to identify K and A with a similar degree of accuracy, the integral method of my invention is employed as shown in box 56. In that method, the differential form of model Equation 1 shown in Equation 2 is integrated with respect to time; a residual is formed by insertion of actual observations of $x$ and $y$ which in sampled data form means that the residual is:

$$R(t_i) = y_i - y_0 + A \sum_{i=1}^{i} T(y_{i-1} - y_r) \\ -KA \sum_{i=1}^{i} T(x_{i-N_\tau-1} - x_r) \quad (8)$$

where: $x_i$, $y_i$, $x_r$, $y_r$, T, $\tau$ and K, and A have the same meaning as before.

The method now evaluates the A and AK values which minimize $$\sum_{i=1}^{N} R^2(t_i) \quad (9)$$

as for the derivative method. Since $\tau$ is normally estimated better by the derivative method, the optimal value acquired by that method is used in the solution by the integral method. The solution for A and AK by the integral method is obtained by solving the following matrix expression:

$$\binom{A}{AK} = \left[ \begin{matrix} \sum_{i=1}^{N} T \left[ \sum_{j=1}^{N} T(y_{j-1}-y_r) \right]^2 \\ -\sum_{i=1}^{N} T \sum_{j=1}^{i} T(y_{j-1}-y_r) \sum_{j=1}^{i} T(x_{j-N_\tau-1}-x_r) \end{matrix} \right.$$

$$\left. \begin{matrix} -\sum_{i=1}^{N} T \sum_{j=1}^{i} T(y_{j-1}-y_r) \Sigma T(x_{j-N_\tau-1}-x_r) \\ \sum_{i=1}^{N} T \left[ \sum_{j=1}^{i} T(x_{j-N_\tau-1}-x_r) \right]^2 \end{matrix} \right]^{-1} \quad (10)$$

$$\left[ \begin{matrix} -\sum_{i=1}^{N} T \sum_{j=1}^{i} T(y_{j-1}-y_r)(y_i-y_0) \\ \sum_{i=1}^{N} T\Sigma T(x_{j-N-\tau-1}-x_r)(y_i-y_0) \end{matrix} \right]$$

The solution for K is given by:

$$K = \frac{AK}{A} \quad (11)$$

Looking at the above operations in review, it can be noted that the derivative method yielded an optimal value for $\tau$ as well as first values for A and K, while the integral method used the optimal value of $\tau$ to obtain second values for A and K. Although the values for A and K determined by the integral method are generally better, it is not always the case. Which values of A and K are to be used?

With continued reference to FIG. 3, note that a check and comparison step is included to answer that question and determine which values of A and K are most suitable. Namely, box 58 of FIG. 3 shows the successive substitution of the values for K, A and $\tau$ acquired first by the derivative and then by the integral method into the right hand expression of Equation 1. A set of numerical values for y is calculated using the observed values of x as the input time series, and signals representing the y value defining model output at different times are generated. That signal is referred to as a model output signal. The actual process output signal values which were gathered are compared to that of the model output signal.

If the comparison is acceptable for both the set of parameter values determined by the derivative method and the set of values determined by the integral method, a further comparison is made to determine the set of parameter values providing the smallest overall deviation (least sum of the deviation squared for all observed process output samples) between the model output and the actual, or observed, process output. The set with the smallest overall deviation (to be called model output variance) is accepted as the final answer.

It may be helpful at this point to consider an example of illustrative values for the various terms used herein presented in the following table. In this example, the input variable x could be stock flow and the output variable could be basis weight. The terms $x_i$ and $y_i$ are measured or sampled data terms, while $x_r$ and $y_r$, the steady state terms, are estimated by curve fitting techniques from previously measured data.

TABLE

| Sample number i | $x_i$ | $y_i$ | $x_r$ | $y_r$ | Sampling time | K, A, $\tau$ derivative | K, A, $\tau$ integral |
|---|---|---|---|---|---|---|---|
| 1 | 21.8 | 39.8 | | | | | |
| 2 | 21.9 | 40.1 | | | | | |
| 3 | 22.3 | 53.6 | | | | K=9.5 | K=10.4 |
| 4 | 22.1 | 58.2 | | | | | |
| 5 | 22.1 | 61.4 | 20 | 40 | 1 sec | A=.95 | A=.99 |
| 6 | 22.0 | 59.8 | | | | | |
| 7 | 22.1 | 59.1 | | | | $\tau$=2.1 | $\tau$=2.1 |
| 8 | 21.8 | 62.3 | | | | | |
| 9 | 21.9 | 61.2 | | | | | |
| 10 | 22.0 | 60.7 | | | | | |

In the above example, the parameter values identified by the integral method would be selected as the best.

It should be noted that the above example is merely illustrative. It is not represented that this data has been obtained from an actual process, or control loop of such a process, nor that the numerical values have been obtained through a vigorous mathematical exercise. However, the values are typical, or representative, of the magnitudes one would obtain through the novel method of this invention.

Since the integral method normally estimates the values of A and K better than the derivative method, the former method will typically provide the better answer. The low accuracy in estimating the value of $\tau$ by the integral method in the event one attempted to search for the best value of that parameter by minimizing $$\sum_{i=1}^{N} R^2(t_i) \quad (12)$$

has been avoided. However, practical situations do exist where the derivative method would be so strongly influenced by process noise that no estimate of $\tau$ or other parameters is possible from that method. Still, the integral method of my invention has been found applicable and can be used to determine all parameters. It is then necessary to search for $\tau$ as well as solving for A and AK by Equation 10. A novel feature incident to this invention is that the search for $\tau$ by the integral method is performed so that the sum of the squared values of the difference between the model output and actual process output is minimized. The accuracy in the estimation of $\tau$ by this technique is much higher than was possible by other known techniques.

With continued reference to FIG. 3, box 60 indicates that the identified parameters are then used to tune a controller. Box 62 then demonstrates the actual setting of input variable values in accordance with the new controller operation flowing from utilizing the parameters identified by the novel method of my invention.

Figure 4:
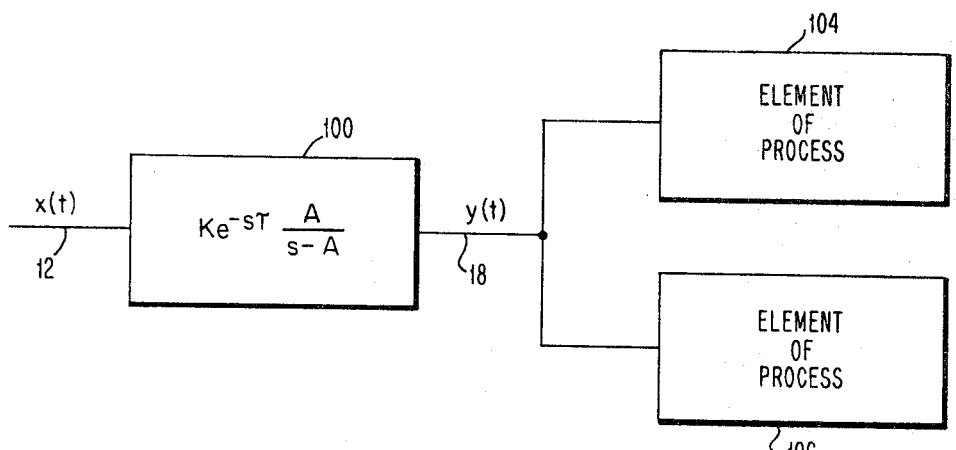
FIG. 4 shows a block diagram of a process and its associated model equation.

FIG. 4 is of assistance in understanding how the novel method of my invention can be applied to elements of a process. With reference to FIG. 4, process 10 may comprise a plurality of stages, 100, 104, 106, where the output variable of one stage may serve as an input variable to the next stage. Input variables x(t) to one stage 100 are present on line 12, which also appears in FIG. 1. Output variables y(t) are present on line 18, which also appears in FIG. 1. Noise signals can be represented by signals on lines 12 and 18 as well; their appearance can be compensated for by the hybrid technique, or nature, of my invention as well as by filtering on the input and the output. In a Fourdrinier papermaking machine x(t) could represent, for example, the stock valve position, stock flow, dry material flow or steam pressure. Similarly, y(t) could be signals representing either the basis weight, stock flow, dry material flow, steam pressure or the moisture content of the finished paper product. The fact that some of these variables occur in some instances as input variables and in other instances as output variables is explained by the fact that the process can be partitioned into a plurality of stages as noted above. Thus, the novel method of my invention can be used either on stages of a process or on an entire process.

My invention is also well suited to filtering the process input and output variable measurements. The filter characteristic can be selected automatically by an associated computer. Filter design per se is well known to the art—see for example, "Data Smoothing and Prediction," by R. B. Blackman, published by Addison and Wesley in 1965.

Various filters are used and parameter values with each filter are checked against previous values. The effect of process noise can be normalized. The filter yielding the best fit between model output and process output is then chosen as the best filter.

While the invention has been particularly shown and described with reference to a preferred embodiment thereof, it will be understood by those skilled in the art that the foregoing and other changes in form and details may be made therein without departing from the spirit and scope of the invention. Particularly a number of control loops can be tuned simultaneously. That is, a number of different inputs and outputs are monitored and associated sets of dynamic parameters are determined, thus extending the scope of my invention.

I claim:

1. In a method of process control requiring identification of process parameter values of an existent process wherein said process is characterized by a model equation with known process parameters but unknown process parameter values relating a controlled variable to a controlling variable, said existent process having as a part of the means for accomplishing said process, a controller generating a control signal, said controller being responsive to gain control signals to establish the gains thereof, a tuner for generating said gain control signals in response to input signals, and means for adjusting said controlling variable in response to said control signal, the improvement thereto of a method for identifying said process parameter values comprising the steps of:

perturbating said controlling variable;

measuring said controlled variable and said controlling variable at selected times, and providing measurement signals representative thereof;

generating a first signal, in response to said measurement signals, said first signal representing at least one said process parameter value, said signal being generated in accordance with a minimizing of the sum of the residuals squared of a differentiated version of said model equation;

generating second signals, in response to said measurement signals and said first signal, said second signals representing other of said process parameter values, said signals being generated in accordance with a minimizing of the sum of the residuals squared of an integrated version of said model equation; and selecting said generated signals representing the desired values of the process parameters from said generated signals for use by said tuner, said selected signals comprising said input signals thereto, whereby said tuner responds thereto to generate gain control signals representing controller gain coefficients tuned to the present state of said process for an associated controller, said gain control signals establishing the gains of said controller.

2. A method of process control for identifying process parameters of the type set forth in claim 1 wherein said process includes a plurality of controlled loops each said loop including a conrtolled variable and a controlling variable characterized by a model equation.

3. A method of process control for identifying process parameters of the type set forth in claim 2 wherein at least one of said controlled loops is characterized by a model equation of the following form:

$$\frac{y(s)}{x(s)} = K e^{-s\tau} \frac{A}{s+A}$$

wherein:

said process parameters are K, A and $\tau$;
K represents process gain;
A represents a process pole value;
$\tau$ represents the process transport delay;
$y(s)$ represents process output variable values;
$x(s)$ represents process input variable values;
$s$ represents the Laplace symbol; and
$e$ represents the natural logarithmic base.

4. A method of process control for identifying process parameters of the type set forth in claim 3 wherein said process comprises the fabrication of paper.

5. A method of process control for identifying process parameters of the type set forth in claim 1 wherein said first generating step, in accordance with said residual method employing said differentiated version of said model equation includes the steps of:

calculating in response to said measurement signals a solution for the following matrix:

$$\binom{A}{AK} = \begin{bmatrix} \sum_{i=1}^{N} T(y_{i-1}-y_r)^2 & -\sum_{i=1}^{N} T(x_{i-N_\tau-1}-x_r)(y_{i-1}-y_r) \\ -\sum_{i=1}^{N} T(x_{i-N_\tau-1}-x_r)(y_{i-1}-y_r) & \sum_{i=1}^{N} T(x_{i-N_\tau-1}-x_r)^2 \end{bmatrix}^{-1}$$

$$\begin{bmatrix} -\sum_{i=1}^{N}(y_{i-1}-y_r)(y_i-y_{i-1}) \\ \sum_{i=1}^{N}(x_{i-N_\tau-1}-x_r)(y_i-y_{i-1}) \end{bmatrix}$$

where:

A represents a process pole value;
K represents process gain;
$(\ )^{-1}$ represents the inverse of the matrix;
$x_r$ comprises a signal representing the steady state value of said controlling variable;
$y_r$ comprises a signal representing the steady state value of said controlled variable;
T comprises a signal representing the sampling time between successive samples of variables;
$N_\tau$ = the number of sampling intervals corresponding to the transport delay $\tau$;
$i$ = a particular sample;
$\tau$ = process transport delay;

generating by an instrumentality a first signal representing parameter A;
generating by an instrumentality a first signal representing AK;
generating a first signal representing parameter K by dividing the first signal representing AK by the first signal representing A;
generating a first signal representing parameter $\tau$;
said second generating step, in accordance with said residual method employing said integrated version of said model equation, comprises calculating in response to said measurement signals and said first signal representing parameter $\tau$ a solution for the following matrix:

$$\binom{A}{AK} = \begin{bmatrix} \sum_{i=1}^{N} T\left[\sum_{j=1}^{i} T(y_{j-1}-y_r)\right]^2 & -\sum_{i=1}^{N} T \sum_{j=1}^{i} T(y_{j-1}-y_r)\sum_{j=1}^{i} T(x_{j-N_\tau-1}-x_r) \\ -\sum_{i=1}^{N} T \sum_{j=1}^{i} T(y_{j-1}-y_r)\sum_{j=1}^{i} T(x_{j-N_\tau-1}-x_r) & \sum_{i=1}^{N} T\left[\sum_{j=1}^{i} T(x_{j-N_\tau-1}-x_r)\right]^2 \end{bmatrix}^{-1}$$

$$\begin{bmatrix} -\sum_{i=1}^{N} T \sum_{j=1}^{i} T(y_{j-1}-y_r)(y_i-y_o) \\ \sum_{i=1}^{N} T \sum_{j=1}^{i}(x_{j-N_\tau-1}-x_r)(y_i-y_o) \end{bmatrix}$$

where: A, K, ( )$^{-1}$, $x_r$, $y_r$, T, $N_r$, $i$ and $\tau$ are defined as above, but said $\tau$ employed herein comprises parameter $\tau$ as represented by said generated signal;
generating of second signal representing A;
generating a second signal representing AK;
generating a second signal representing parameter K by dividing the signal representing AK by the signal representing A; and
said selecting step comprises selecting one of said sets of signals to represent parameters A and K and selecting said first signal representing parameter $\tau$.

6. A method of process control for identifying process parameters of the type set forth in claim 5 wherein said selecting step comprises the steps of:
generating a first controlled variable signal by solving said model equation with the parameter values represented by said first signals obtained from said derivative method and with the measured values of said controlling variable represented by said measurement signals;
generating a second controlled variable signal by solving said model equation with the parameter values represented by said second signals obtained from said integral method and with the measured values of said controlling variable represented by said measurement signals;
generating a first difference signal by contrasting said first controlled variable signal to a measured controlled variable signal;
generating a second difference signal by contrasting said second controlled variable signal to said measured controlled variable signal; and
selecting the best set of identified parameter value signals by choosing that set corresponding to the smallest difference signal.

7. A method of process control for identifying process parameters of the type set forth in claim 1 wherein:
said first generating step includes generating first signals, in response to said measurement signals, said first signals representing said process parameter values;
said second generating step comprises generating second signals, in response to said measurement signals and one of said first signals, said second signals representing certain of said parameter values; and
said selecting step includes the steps of:
generating a first controlled variable signal by solving said model equation with the parameter values represented by said first signals obtained from said derivative method and with the measured values of said controlling variable represented by said measurement signals;
generating a second controlled variable signal by solving said model equation with the parameter values represented by said second signals obtained from said integral method and with the measured values of said controlling variable represented by said measurement signals;
generating a first difference signal by contrasting said first controlled variable signal to a measured controlled variable signal;
generating a second difference signal by contrasting said second controlled variable signal to said measured controlled variable signal; and
selecting the best set of identified parameter value signals by choosing that set corresponding to the smallest difference signal.

8. A method of the type set forth in claim 7 wherein:
the steps of measuring said controlled and controlling variable includes filtering said measurement signals with a plurality of filters; and
said identification method comprises in addition comparing said parameter value signals obtained for each filter constant to a standard value signal; and
selecting the best set of parameter value signals and thereby the best filter value for the particular process.

9. A method of process control for identifying process parameters of the type set forth in claim 1 wherein:
the steps of measuring the controlled and controlling variables includes filtering said measurement signals with a plurality of filters; and
said identification method additionally comprises comparing said parameter value signals obtained for each filter constant to a standard value signal; and
selecting the best set of parameter value signals and thereby the best filter value for that particular process.

References Cited

Kershow: "Adaptive Control by Plant Identification" Control Engineering, September 1965, pp. 103–110.

EUGENE G. BOTZ, Primary Examiner

U.S. Cl. X.R.
235—156

UNITED STATES PATENT OFFICE
CERTIFICATE OF CORRECTION

Patent No. 3,534,400          Dated October 13, 1970

Inventor(s) Erik Bjorn Dahlin

It is certified that error appears in the above-identified patent and that said Letters Patent are hereby corrected as shown below:

In col. 9, lines 3-19, the lower line of the material within the last brackets should read:

$$\sum_{i=1}^{N} T \sum T(x_j - N_\tau - 1^{-x}r)(y_i - y_0)$$

In Col. 12, in the first equation in Claim 5, the material within the first brackets should be to the power of -1.

In Col. 12, in the second equation of Claim 5, the lower line of the material within the last brackets should read:

$$\sum_{i=1}^{N} T \sum_{j=1}^{i} T(x_j - N_\tau - 1^{-x}r)(y_i - y_0)$$

SIGNED AND SEALED
DEC 29 1970

(SEAL)
Attest:

Edward M. Fletcher, Jr.
Attesting Officer

WILLIAM E. SCHUYLER, JR.
Commissioner of Patents